(12) United States Patent
Budeeva et al.

(10) Patent No.: US 9,611,384 B2
(45) Date of Patent: Apr. 4, 2017

(54) METHOD FOR PRODUCING BRANCHED FUNCTIONALIZED DIENE (CO)POLYMERS

(71) Applicant: Open Joint Stock Company "SIBUR Holding", St. Petersburg (RU)

(72) Inventors: Anna Viktorovna Budeeva, Tomsk (RU); Artur Igorevich Rakhmatullin, Kazan (RU); Alexander Viktorovich Rogalev, Barnaul (RU); Viktor Ivanovich Aksenov, Moscow (RU)

(73) Assignee: Public Joint Stock Company "Sibur Holding", Tobolsk (RU)

( * ) Notice: Subject to any disclaimer, the term of this patent is extended or adjusted under 35 U.S.C. 154(b) by 56 days.

(21) Appl. No.: 14/350,032

(22) PCT Filed: Oct. 3, 2012

(86) PCT No.: PCT/RU2012/000806
§ 371 (c)(1),
(2) Date: Apr. 4, 2014

(87) PCT Pub. No.: WO2013/051966
PCT Pub. Date: Apr. 11, 2013

(65) Prior Publication Data
US 2014/0249276 A1 Sep. 4, 2014

(30) Foreign Application Priority Data
Oct. 4, 2011 (RU) ................. 2011140301

(51) Int. Cl.
| | | |
|---|---|---|
| C08L 47/00 | (2006.01) | |
| C08L 9/00 | (2006.01) | |
| C08L 9/06 | (2006.01) | |
| C08C 19/22 | (2006.01) | |
| C08C 19/44 | (2006.01) | |
| C08F 36/06 | (2006.01) | |
| C08F 36/08 | (2006.01) | |
| C08F 136/06 | (2006.01) | |
| C08F 236/06 | (2006.01) | |
| C08F 236/08 | (2006.01) | |
| C08F 236/10 | (2006.01) | |
| C08L 53/02 | (2006.01) | |
| C08F 297/04 | (2006.01) | |

(52) U.S. Cl.
CPC ............. *C08L 47/00* (2013.01); *C08C 19/44* (2013.01); *C08F 36/06* (2013.01); *C08F 36/08* (2013.01); *C08F 136/06* (2013.01); *C08F 236/06* (2013.01); *C08F 236/08* (2013.01); *C08F 236/10* (2013.01); *C08F 297/04* (2013.01); *C08L 9/06* (2013.01); *C08L 53/02* (2013.01); *C08C 19/22* (2013.01); *C08L 9/00* (2013.01)

(58) Field of Classification Search
CPC .... C08L 47/00; C08L 9/00; C08L 9/06; C08L 53/02; C08F 297/04; C08F 36/06; C08F 36/08; C08F 136/06; C08F 236/06; C08F 236/08; C08F 236/10; C08C 19/22; C08C 19/44
USPC ... 525/331.9, 332.9, 374, 379, 342, 370, 53; 526/65, 335, 340, 173
See application file for complete search history.

(56) References Cited

U.S. PATENT DOCUMENTS

| | | | |
|---|---|---|---|
| 4,397,994 A | 8/1983 | Takeuchi et al. | |
| 4,523,618 A | 6/1985 | Yamamoto et al. | |
| 4,575,534 A | 3/1986 | Oshima et al. | |
| 5,066,721 A | 11/1991 | Hamada et al. | |
| 5,268,439 A | 12/1993 | Hergenrother et al. | |
| 5,959,048 A | 9/1999 | Lawson et al. | |
| 6,867,265 B2 * | 3/2005 | Halasa ................ | C08F 297/044 525/332.8 |
| 2002/0107339 A1 * | 8/2002 | Knauf .................... | C08F 36/04 526/65 |
| 2006/0142145 A1 * | 6/2006 | Thiele ................... | B01J 31/143 502/103 |

(Continued)

FOREIGN PATENT DOCUMENTS

| | | |
|---|---|---|
| RU | 2 073 023 | 2/1997 |
| RU | 2 175 330 | 10/2001 |

(Continued)

OTHER PUBLICATIONS

Tsutsumi, F. et al. (Mar. 1990) "Structure and Dynamic Properties of Solution SBR Coupled with Tin Compounds." *Rubber Chemistry and Technology* 63(1): pp. 8-22.

(Continued)

*Primary Examiner* — Roberto Rabago
(74) *Attorney, Agent, or Firm* — Morrison & Foerster LLP

(57) ABSTRACT

The method consists of a polymerization process or a copolymerization process which is carried out in two parallel reactors, and each of dienes are polymerized or copolymerized with each other and/or with arylvinyl compounds, wherein an organolithium initiator, an electron donor additive and a branching agent are fed into the first reactor, and an organo lithium initiator, an electron donor additive and a functionalizing agent are fed into the second reactor, and the resultant polymerized mixtures are subsequently mixed with each other. This method allows for producing branched functionalized (co)polymers of dienes that are characterized by a statistical distribution of monomer units, a high content of vinyl units (1,2-butadiene units and/or 3,4-isoprene units (more than 60%)), a narrow molecular weight distribution and a controllable content of branched and functionalized parts in the (co)polymer.

15 Claims, No Drawings

(56) References Cited

U.S. PATENT DOCUMENTS

2008/0293896 A1* 11/2008 Chirinos-Colina ..... C08F 10/00
526/117
2010/0022724 A1* 1/2010 Jacobsen ................ C08F 10/00
526/117

FOREIGN PATENT DOCUMENTS

| SU | 1001671 | 2/1992 |
| WO | WO-2009/077837 | 6/2009 |
| WO | WO 2009/077837 A1 * | 6/2009 |

OTHER PUBLICATIONS

Sierra, C.A. et al. (May 1995). "Dynamic-Mechanical Properties of Tin-Coupled SBRs." *Rubber Chemistry and Technology* 68(2):259-266. English translation of abstract provided.

Hsieh, H.L. et al. (1996). *Anionic Polymerization: Principles and Practical Applications Plastic Engineering*, Marcel Dekker Inc., CRC Press, pp. 1-908.

Kuperman, F.E. (2005). *New Tire Rubbers Tires. Priority requirements. Test Methods*. Aliens Press, Moscow, 329 pages. English translation of abstract provided.

Pichugin, A.M. (2008) *Materials Science Aspects of Tire Rubber Design*, The Tire Research Institute, Moscow, 383 pages. English translation of abstract provided.

Quiteria, V.R.-S. et al., (1997) "Tin-coupled styrene-butadiene rubbers (SBRs). Relationship between coupling type and properties," *Makromol. Chem.* 246:85-96.

Uraneck, C.A. et al. (1970), "Solution-Polymerized Rubbers With Superior Breakdown Properties," *J. Appl. Polym. Sci.* 14:1421-1432.

International Search Report mailed Feb. 21, 2013, directed towards International Application No. PCT/RU2012/000806, 4 pages.

* cited by examiner

METHOD FOR PRODUCING BRANCHED FUNCTIONALIZED DIENE (CO)POLYMERS

CROSS-REFERENCE TO RELATED APPLICATIONS

This application is a national phase filing under 35 U.S.C. §371 of International Application No. PCT/RU2012/000806, filed Oct. 3, 2012, which claims priority to Russian Federation Patent Application No. 2011140301, filed on Oct. 4, 2011.

FIELD OF THE INVENTION

The invention relates to the field of producing synthetic rubbers, in particular diene (co)polymers, such as polybutadiene, polyisoprene and styrene-butadiene rubber (SBR), that are useful for in the production of tyres and industrial rubber articles, for the modification of bitumens, in electrical engineering and in other fields.

BACKGROUND OF THE INVENTION

Diene (co)polymers are prepared by polymerization or copolymerization of appropriate monomers in a hydrocarbon solvent in the presence of an organolithium compound and an electron donor additive used to make the copolymerization rate constants of the monomers more consistent, wherein the electron donor additive can be selected from alkali metal alcoholates, tertiary diamines, and ethers [RU 2073023, U.S. Pat. No. 6,867,265 B2, U.S. Pat. No. 4,397,994, U.S. Pat. No. 4,575,534].

Various branching agents providing the formation of branched (co)polymer molecules are used when synthesing rubbers to improve the processability thereof. The degree of branching of (co)polymers has an effect on their properties such as crystallinity, plastic-elastic properties, elasticity of solutions, and melt viscosity, allowing for the creation of new copolymer materials with improved properties.

Analysis of literature sources [F. Tsutsumi, M. Sakakibara, and N. Oshima, Rubber Chem. Technol., 63, 8 (1990); C. A. Siena, C. Galan, M. J. Gomez Eaton, and V. Ruiz Santa Quiteria, Rubber Chem. Technol., 68, 259 (1995)] shows that there are two main groups of branching agents: organosilicon and organotin compounds (silanes, siloxanes, stannates) and vinyl derivatives (divinylbenzene, triacetobenzene, etc.).

The group of organosilicon and organotin compounds is the most often used group. This group encompasses a great diversity of silicon and tin compounds, starting from simplest representatives such as tri- and tetrahalides of silicon and tin, and up to their functionalized alkyl derivatives, such as $MeO_3Si-(CH_2)_2-SiMeO_3$, $Cl_3Si-(CH_2)_2-SiCl_3$, $SiCl_3-CH_2-C(CH_2)-CH_2-SiCl_3$, and siloxanes, for example, $Cl_3Si-O-SiCl_3$, $Cl_3Si-O-SiCl_2-O-SiCl_3$.

It should be noted that the simplest representatives of said group of branching agents ($SiCl_4$ or $SnCl_4$) are preferable as a component used for industrial producing SBRs [H. L. Hsieh and R. P. Quirk. Anionic Polymerization: Principles and Practical Applications, Dekker, New York, 1996].

U.S. Pat. No. 4,523,618 patent discloses a method for producing a branched styrene-butadiene rubber by using compounds of the following common formula $Cl_nMeR_{4-n}$, wherein n is 3 to 4, Me is Si or Sn, R is Alk, $Ar(C_1-C_{20})$, as a branching agents. The method comprises loading a reactor with monomers, electron donor additives (0.15 to 5% by weight of TGF (tetrahydrofuran) or 0.01 to 0.5% by weight of TMEDA (tetramethylethylenediamine)) and an organolithium initiator. Copolymerization is carried out up to completing conversion of monomers, at 20 to 120° C. for from 0.1 to 24 hours, and thereafter the branching agent is added to the polymerized mixture. After the completion of the branching process, the copolymer is isolated from the reaction mixture by adding lower alcohols. A stabilizer such as 2,6-di-tert-butyl-p-crezole (0.5 to 1% by weight of copolymer) is added to the obtained product. This method makes it possible to produce branched SBRs with a styrene content of 25% and a 1,2-butadiene content of 32%.

The branched copolymers produced by the aforesaid method have a low content of 1,2-butadiene units (not more than 47%), which is insufficient for producing rubbers for treads with a required set of properties, in particular a high wet skid resistance and a low rolling resistance. In order to achieve the aforesaid properties, the optimal content of 1,2-butadiene units in rubber should be more than 60% [Kuperman F. E., Novel rubbers for tires. Priority requirements. Methods of assessment.—Moscow, 2005.—329 p.; Pichugin A. M., Materials science aspects of tire rubber development.—Moscow, 2008.—384 p.].

Patent U.S. Pat. No. 5,066,721 A (Nov. 19, 1991) of Bridgestone Corporation (Japan) also discloses a method for producing a branched styrene-butadiene rubber, wherein organic silicon derivatives containing halogen atoms (chlorine or bromine) are used as a branching agent. The method uses ethers (tetrahydrofuran, dimethoxyethane, and dimethyl and dibutyl ethers of diethylene glycol, etc.) and tertiary amines (pyridine, triethylamine, N,N,N',N'-tetramethylethylenediamine (TMEDA), N-methylmorpholine, and others) as the electron donor additive. Organolithium compounds, including n-butyllithium, are used as an initiator of the copolymerization process. This method makes it possible to produce copolymers containing about 60% of 1,2-butadiene units.

It is known in the art that the presence of functional groups in the structure of a copolymer, for example tin-, silicon- or amino-containing groups, allows to achieve an improved distribution of reinforcing fillers in the rubber matrix (copolymer), which in turn reduces hysteresis loss and increases the durability and wet grip. [V. R.-S. Quiteria, C. A. Sierra, J. M. Gomez-Fatou, C. Galan, L. M. Fraga. "Tin-coupled styrene-butadiene rubbers (SBRs). Relationship between coupling type and properties"//Macromolecular Materials and Engineering, 1999, 246, 2025-2032; C. A. Uraneck, J. N. Short, "Solution-polymerized rubbers with superior breakdown properties"//J. Appl. Polym. Sci. 2003, 14, 1421-1432].

U.S. Pat. No. 5,268,439 (Dec. 7, 1993) discloses a method for producing a branched functionalized SBR, wherein styrene and butadiene are copolymerized in the presence of an organolithium initiator and electron donor additives, followed by the addition of a branching agent. The lithium initiator is (tributyltin)lithium corresponding to the formula $(R)_3SnLi$, wherein R is alkyl. This initiator acts as a functionalizing agent due to the presence of tin. Compounds such as N,N,N',N'-tetramethylethylenediamine, tetrahydrofuran, etc. can be used as the electron donor additive. As the coupling branching agent compounds are used that are selected from $SnCl_4$, alkyl-tin chlorides, and N,N'-dimethylethylurea. The resultant copolymer of general formula $R_3SnYLi$, wherein Y is a copolymer radical, has a styrene content of 20.6%, a vinyl content of 51.4%; a Mooney viscosity of 65; tear strength of 21 MPa, relative elongation of 376%; tgδ (23° C.) of 0.1079; tgδ (50° C.) of 0.0739; $M_n$=556000 g/mol.

This method provides copolymers with a low content of 1,2-butadiene units and a high value of polydispersity. In addition, a disadvantage of this method consists in the necessity to use an expensive and unstable lithium initiator that preparation takes about 20 hours.

U.S. Pat. No. 5,959,048 (Sep. 28, 1999) considered as the closest prior art discloses a method of forming a branched functionalized styrene-butadiene rubber in an acyclic alkane solvent and in the presence of an amine-containing organolithium initiator, wherein the initiator is a mixture of a lithium amine of formula $A_1Li$ taken in an amount of about 90 to about 10 parts by weight and lithium amine of formula $A_2Li$ taken in an amount of about 10 to about 90 parts by weight, wherein $A_1$ and $A_2$ are different or independently selected from the group consisting of dialkyl-, alkyl-, cycloalkyl- and dicycloalkylamine radicals of the formula

and cyclic amine radicals of the formula

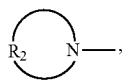

wherein each $R_1$ is independently selected from the group consisting of alkyl, cycloalkyl and aryl, having from 3 to about 12 carbon atoms, and $R_2$ is selected from the group consisting of an alkylene, oxy- or amino-alkylene group having from about 3 to about 16 methylene groups (for example, a mixture of lithium trimethyl-hexamethyleneamide and lithium 3,3,5-trimethyltetrahydroazepine). Then the obtained polymer reacts with a branching agent, which may be, in particular, a compound of the formula $(R_3)_aZX_b$, wherein Z is tin or silicon, $R_3$ is selected from the group consisting of alkyl comprising from 1 to 20 carbon atoms, aryl comprising from 6 to 20 carbon atoms; X is chlorine or bromine; a is 0 to 3, b is 1 to 4, and a+b=4. The initiator used in this known method is prepared by a reaction of n-butyllithium with a mixture of brenched amines of the above-indicated structure in an alyphatic solvent medium. Compounds useful as the electron donor additive are tetrahydrofuran, 2-2'-ditetrahydrofuranpropan, dipiperidinethane, dimethyl ether, diethyl ether, tributylamine, tetramethylethylenediamine (TMEDA), ethylene glycol ethers, and crown ethers. The resulting polymer is vulcanized to produce rubbers with reduced hysteretic loss, reduced rolling resistance and reduced heat build-up. The resulting copolymer contains 20.1% of styrene (1.6% of block styrene), 43.8% of 1,2-butadiene units, and has glass transition temperature of −49° C., $M_n$=145511, polydispersity of 1.90, and a Mooney viscosity of 62.

Copolymers produced according to this method have a low content of 1,2-butadiene units. In addition, a disadvantage of the method of forming a functionalized polymer consists in the necessity of using a solution of unstable lithium amides as an initiator, wherein precipitation of the nitrogen-containing initiator from the solution occurs after 30-day storage. Such precipitation decreases the concentration of the initiator in the solution and makes it difficult to deliver the initiator in an amount required for the polymerization. In addition, the initiator is obtained by a reaction of n-butyllithium with a mixture of two different amines since the use of only one of amines results to its immediate precipitation [RU Patent 2175330].

In this connection, the purpose of the present invention is to develop an effective method for producing branched functionalized diene (co)polymers characterized by a statistical distribution of monomer units, high content of vinyl units (1,2-butadiene units and/or 3,4-isoprene units (more than 60%)), and a narrow range of the molecular mass distribution (1.4-1.7). The method allows regulation of the amount of the branched and functionalized parts in the (co)polymer.

SUMMARY OF THE INVENTION

The problem solved and the technical result is achieved by polymerization or copolymerization of dienes with each other and/or with arylvinyl compounds to obtain branched functionalized (co)polymers, in a hydrocarbon solvent in the presence of an organolithium initiator, an electron donor additive, a functionalizing agent, and a branching agent. The polymerization is carried out in two parallel reactors, wherein dienes are polymerized or copolymerized with each other and/or with α-olefins, and wherein organolithium initiator, an electron donor additive and a branching agent are fed to the first reactor, and an organolithium initiator, an electron donor additive and a functionalizing agent are fed to the second reactor, followed by mixing the resultant polymerizing mixture with each other. The organolithium initiator is selected from the group consisting of alkyllithium, aryllithium, and alkenyllithium. The organolithium initiator is fed to the second reactor in an amount of from 0.8 to 1.2 mmol based on 100 g of monomers. The functionalizing agent is added when a degree of conversion of the monomers reaches 50 to 100%.

DETAILED DESCRIPTION OF THE INVENTION

The invention provides a method for producing branched functionalized diene (co)polymers, according to which said (co)polymers are produced by polymerization or copolymerization of dienes with each other and/or with α-olefins in a hydrocarbon solvent in the presence of an organolithium initiator, an electron donor additive, a functionalizing agent, and a branching agent.

The dienes preferably used are conjugated dienes, such as butadiene and/or isoprene. Arylvinyl compounds are aromatic cyclic compounds comprising a cyclic substituted or non-substituted aryl group, in particular phenyl, having vinyl group attached thereto, which in turn may be substituted or non-substituted. As the arylvinyl compounds it is preferred to use compounds such as styrene, alpha-methylstyrene, etc.

The organolithium initiator is selected from the group consisting of ethyllithium, isopropyllithium, n-butyllithium, tert-octyllithium, phenyllithium, phenyllithium, 2-naphtyllithium, 4-butylphenyllithium, 4-phenylbutyllithium, and cyclohexyllithium.

As the electron donor additive, a compound comprising at least one heteroatom and/or a mixture thereof with alkali and/or alkaline metal alkoxides is used. For example, it may be a compound represented by one of the following formulas:

R—O—R'

R—O—(CH$_2$)$_n$—O—R'

R—O—(CH$_2$—O)$_n$—R'

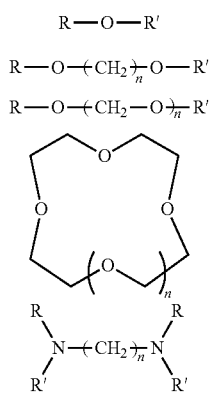

wherein n is from 1 to 20; R, R' are CH$_3$, C$_2$H$_5$, n-C$_3$H$_7$, i-C$_3$H$_7$, n-C$_4$H$_9$, s-C$_4$H$_9$, t-C$_4$H$_9$, i-C$_4$H$_9$, C$_5$H$_{11}$, C$_6$H$_{13}$, C$_7$H$_{15}$, C$_8$H$_{17}$, C$_9$H$_{19}$, C$_{10}$H$_{21}$, C$_6$H$_5$, o-C$_6$H$_4$CH$_3$, m-C$_6$H$_4$CH$_3$, p-C$_6$H$_4$CH$_3$, o-C$_6$H$_4$C$_2$H$_5$, m-C$_6$H$_4$CH$_3$, p-C$_6$H$_4$CH$_3$, and R—O$^-$Me$^+$

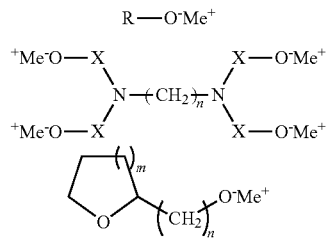

wherein n is from 1 to 20; m is from 1 to 4; Me is Li, Na, and K; X is —CH$_2$—, —C$_2$H$_4$—, —C$_3$H$_6$—, —C$_4$H$_8$—, —C$_5$H$_{10}$—, —C$_6$H$_{12}$—, —C$_7$H$_{14}$—, —C$_8$H$_{16}$—; R is CH$_3$, C$_2$H$_5$, n-C$_3$H$_7$, i-C$_3$H$_7$, n-C$_4$H$_9$, s-C$_4$H$_9$, t-C$_4$H$_9$, i-C$_4$H$_9$, C$_5$H$_{11}$, C$_6$H$_{13}$, C$_7$H$_{15}$, C$_8$H$_{17}$, C$_9$H$_{19}$, C$_{10}$H$_{21}$, C$_6$H$_5$, o-C$_6$H$_4$CH$_3$, m-C$_6$H$_4$CH$_3$, p-C$_6$H$_4$CH$_3$, o-C$_6$H$_4$C$_2$H$_5$, m-C$_6$H$_4$CH$_3$, p-C$_6$H$_4$CH$_3$.

As the electron donor additive, it is also possible to use products of a reaction between the above-mentioned compounds, which can be formed both before and after feeding said compounds to a polymerized mixture.

A mole ratio of the organolithium initiator to the compound comprising at least one heteroatom may be preferably 1:(0.1-1.0), and a mole ratio of the organolithium initiator to the alkali and/or alkaline metal alkoxide may be preferably 1:(0.1-1.0). These limitations of the mole ratios are determined by the necessity of obtaining a specified amount of 1,2-butadiene units in the butadiene part of a polymer chain, and the necessity of regulating the degree of statistical distribution of styrene in a rubber (absence of microblocks).

The polymerization process is conducted in two reactors connected in parallel, wherein (co)polymerization of corresponding monomers is carried out within each of the reactors. An amount of the organolithium initiator is fed to the first reactor with said amount being preferably of 1.2 to 2.0 mmol based on 100 g of monomers followed by the addition of a branching agent. The branching agent is preferably added when a degree of conversion reaches from 50 to 100%. An amount of the organolithium initiator is fed to the second reactor with said amount being preferably of 0.8 to 1.4 mmol based on 100 g of monomers followed with the addition of a functionalizing agent. The functionalizing agent is preferably added when a degree of conversion reaches from 95 to 100%. Then, the obtained polymerized mixtures from said both reactors are fed to a third reactor preferably at a weight ratio of the first mixture to the second mixture ranging from (0.01-0.99) to (0.99-0.01), and are mixed with each other, followed by carrying out a chain-termination reaction. The method of copolymerization is preferably carried out at a temperature of 30 to 80° C.

As the branching agent, one or more of the following compounds are added in any combinations, which compounds are selected from the group consisting of:

compounds of formulas EHal$_2$R$_2$, EHal$_3$R, E'Hal$_4$, wherein E and E are Sn, Ge or Si; Hal is F, Cl, Br or I; R is linear or branched C$_1$-C$_{20}$-alkyl, preferably C$_1$-C$_8$-alkyl, such as methyl, ethyl, propyl, butyl, isopropyl, 2-ethyl-hexyl, etc.; or aryl such as substituted or unsubstituted C$_6$-C$_{10}$-aryl, preferably benzene derivatives, for example, such as phenyl, tolyl, 2-methylphenyl, etc., or arylalkyl that may be C$_7$-C$_{11}$-arylalkyl, in particular benzene; and compounds which are substituted benzene (C$_6$H$_6$) having at least two hydrogen atoms substituted with a group selected from the following series: -Hal, —CH═CH$_2$, and —C(O)alkyl. Alkyl is a monovalent radical of saturated linear or branched C$_1$-C$_{20}$-hydrocarbon (alkane), preferably C$_1$-C$_8$, for example, methyl, ethyl, propyl, butyl, isopropyl, 2-ethyl-hexyl, etc.; and Hal is as defined above, wherein said compounds are added simultaneously or sequentially.

The branching agent is preferably used at a molar ratio to the organolithium initiator ranging from 0.01 to 0.99. The process of branching is carried out preferably at a temperature of 60 to 80° C. for 5 to 120 minutes.

As the functionalizing agent, the compounds are used which are selected from the group consisting of: N,N-di-substituted aminoalkyl acrylamides and N,N-di-substituted aminoalkyl methacrylamides, such as N,N-dimethylaminopropyl acrylamide and N,N-dimethylaminopropyl methacrylamide; N,N-di-substituted aminoaromatic compounds, such as N,N-dimethylaminoethyl styrene and N,N-diethylaminoethyl styrene; N-substituted cyclic amides, such as N-methyl-2-pyrrolidone, N-vinyl-2-pyrrolidone, N-phenyl-2-pyrrolidone, N-methyl-epsilon-caprolactam; N-substituted cyclic ureas, such as 1,3-dimethylethylene urea and 1,3-diethyl-2-imidazolidinone; and N-substituted aminoketones, for example, such as N,N'-bis-(dimethylamino)benzophenone (Michler's ketone) and N,N'-bis-(diethylamino) benzophenone. The functionalizing agent is used at a molar ratio to the organolithium initiator ranging from 0.5 to 1.0. The functionalization process is carried out preferably at a temperature of 60 to 80° C. for 15 to 60 minutes.

After the synthesis, the catalyst is deactivated and the rubber is stabilized by adding an antioxidant solution, —such as agidol-2 or another type, to the polymerizate in an amount of 0.2 to 0.6 wt. %. Then, the rubber is isolated by known methods, such as water-steam degassing and drying on rollers.

The claimed method provides the production of branched functionalized diene (co)polymers characterized by a statistical distribution of monomer units, narrow molecular weight distribution (MWD), and high content of vinyl units (1,2-butadiene units and/or 3,4-isoprene units (more than 60%)). The main advantage of this method is the possibility to regulate the branched and functionalized parts in a rubber. This allows for obtaining rubbers of different nature (for example, with higher degree of branching, but lower degree of functionalization and vice versa, or equal degrees of branching and functionalization), which in turn effects on the properties of the rubber and compounds thereof. Higher degree of branching (60-90%) provides an improvement in the processing properties of the rubber, whereas higher degree of functionalization provides an improvement in the dynamic parameters of rubber-based mixtures. Thus, it is possible to produce rubbers with a variety of properties, thereby meeting customer demands and broadening the field of their applications.

The invention is illustrated by the examples below.

Example 1

Comparative, According to the Prototype

A glass reactor filled with nitrogen and equipped with a stirrer is loaded with 144 g of butadiene and 36 g of styrene and is dosed with 2 ml of a 0.9 M (1.8 mmol) initiator (a mixture of lithium hexamethylene diamine and lithium pyridine), and then N,N,N',N'-tetramethylenediamine (TMEDA) is added at a TMEDA/RLi molar ratio of 0.30. The reaction mass is stirred at 50° C. for 1.5 hours, then $3.6*10^{-4}$ mol of a branching agent (tin tetrachloride ($SnCl_4$)) is added at the same temperature at the molar ratio of $SnCl_4$:1/4RLi of 0.8:1. The obtained product contains 20.1% of styrene (1.6% of block styrene) and 43.8% of 1,2-butadiene units, glass transition temperature is −49° C., Mn=145511, polydispersity is 1.9, Mooney viscosity is 62 units.

Example 2

Two parallel glass reactors, wherein each reactor is of 1 liter and equipped with temperature and pressure measuring devices, a loader, an unloader, a stirrer and a jacket are filled with a batch consisting of 350 g of nefras preliminarily dried and deoxygenated, 46 g of butadiene and 12 g of styrene (the weight ratio of the monomers in the reaction medium is 80:20). The temperature at which the batch is fed to the reactors is −10° C. When the temperature reaches 15° C., a catalyst system consisting of n-butyllithium and a mixture of electron donor additives is added thereto. The mixture of electron donor additives includes tetramethylene diamine as 0.066 M solution in nefras at a ratio of TMEDA/n-butyllithium of 0.7 mol, and 0.07 M solution of sodium tetrahydrofurylate (STGF) in toluene at a ratio of STGF/n-butyllithium of 0.6 mol. 0.16 M solution of n-butyllithium in nefras is fed to the first reactor in an amount of 1.5 mmol based on 100 g of monomers. To the second reactor, n-butyllithium is fed at the same concentration in an amount of 1.0 mmol based on 100 g of monomers. The process of copolymerization is carried out in both reactors at 60° C. up to conversion of 98.7%. After reaching the conversion, a 0.083 M solution of dibutyltin dichloride in nefras is fed to the first reaction at a molar ratio to Li of 0.1; the reaction is carried out at 80° C. for 30 minutes, then 0.085 M solution of tin tetrachloride in nefras is fed at a molar ratio to Li of 0.2, and the reaction is carried out for additional 45 minutes at the same temperature. After reaching the conversion, the second reactor is loaded with a functionalizing agent (Michler's ketone) in the form of a 0.37 M solution at a molar ratio to Li of 0.8; the reaction is continued for additional 30 minutes at the same temperature. After that, the polymerized mixture from the first reactor is mixed with the polymerized mixture from the second reactor in a weight ratio of 0.01:0.99 for 5 minutes. As an antioxidant, Agidol-2 in an amount of 0.5 wt. % is used.

The obtained product contains 21.1% of styrene and 64% of 1,2-butadiene units, glass transition temperature is −24° C., Mn=318000, polydispersity is 1.4, Mooney viscosity is 45 units.

Example 3

The process is carried out as described in Example 2, except that the amount of n-butyllithium is 1.2 mmol based on 100 g of monomer in the first reactor and 0.8 mmol based on 100 g monomer in the second reactor. A 0.082 M solution of dibromodiphenylsilane in nefras is used as a branching agent in the first reactor at a molar ratio to Li of 0.2; the reaction is carried out for 45 minutes at 60° C., then 0.089 M solution of germanium tetrachloride is added at a molar ratio to Li of 0.15, and the reaction is carried out for additional 45 minutes at the same temperature. When conversion reaches 99.0%, a functionalizing agent (Michler's ketone) is fed to the second reactor, and the reaction is carried out for additional 15 minutes at the same temperature. After that, the polymerized mixture from the first reactor is mixed with the polymerized mixture from the second reactor at a weight ratio of 0.99:0.01 for 15 minutes. The obtained product contains 20% of styrene and 63% of 1,2-butadiene units, glass transition temperature is −25° C., Mn=330000, polydispersity is 1.7, Mooney viscosity is 48 units.

Example 4

The process is carried out as described in Example 2, except the use 0.66 M diethylamine in nefras in a ratio of diethylamine/n-butyllithium of 0.7 mol and 0.047 M ethylene glycol di-tert-butyl ether (EGDTBE) in nefras in the EGDTBE/n-butyllithium ratio of 0.7 mol, as a mixture of electron donor additives. When conversion reaches 0.99%, 0.082 M dibromodiphenylsilane in nefras is fed to the first reactor in a molar ratio to Li of 0.3; the reaction is carried out for 30 minutes at 60° C.; then 0.085 M tin tetrachloride is added in a molar ratio to Li of 0.1, and the reaction is carried out for additional 45 minutes at the same temperature. The reaction with a functionalizing agent in the second reactor is carried out for 60 minutes. After that, the polymerized mixture from the first reactor is mixed with the polymerized mixture from the second reactor in a weight ratio of 0.2:0.8 for 2 minutes.

The obtained product contains 20.5% of styrene and 62% of 1,2-butadiene units, glass transition temperature is −27° C., Mn=310000, polydispersity is 1.4, Mooney viscosity is 45.

Example 5

The process is carried out as described in Example 2, except that, when conversion reaches 99.0%, a 0.083 M methyltin trichloride in nefras is fed to the first reactor in a molar ratio to Li of 0.1; the reaction is carried out for 30 minutes at 70° C., then 0.089 M silicon tetrabromide is added in a molar ratio to Li of 0.2, and the reaction is carried out for additional 60 minutes at the same temperature. After that, the polymerized mixture from the first reactor is mixed with the polymerized mixture from the second reactor in a weight ratio of 0.8:0.2 for 10 minutes.

The obtained product contains 20.2% of styrene and 66% of 1,2-butadiene units, glass transition temperature is −21° C., Mn=307000, polydispersity is 1.6, Mooney viscosity is 46.

Example 6

The process is carried out as described in Example 2, except that the first reactor is loaded simultaneously with 0.083 M dibutyltin dibromide in nefras in a molar ratio to Li of 0.2 and 0.089 M germanium tetrachloride in nefras in a molar ratio to Li of 0.15; the reaction is carried out at 80° C. for 45 minutes. N,N-dimethylaminopropyl metacrylate is added to the second reactor as a functionalizing agent, in a molar ratio to Li of 0.1; the reaction is carried out for 30 minutes. After that, the polymerized mixture from the first reactor is mixed with the polymerized mixture from the second reactor in a weight ratio of 0.3:0.7 for 5 minutes.

The obtained product contains 20.5% of styrene and 65% of 1,2-butadiene units, glass transition temperature is −25° C., Mn=322000, polydispersity is 1.5, Mooney viscosity is 46.

Example 7

The process is carried out as described in Example 2, except the use of 0.075 M potassium tetrahydrofurfurylate in toluene in the PTGF/n-butyllithium ratio of 0.8 mol and 0.047 M ethylene glycol di-tert-butyl ether in nefras in the EGDTBE/n-butyllithium ratio of 0.6 mol as a mixture of electron donor additives. The dose of n-butyllithium is 2.0 mmol based on 100 g of monomer in the first reactor, and 1.2 mmol based on 100 g monomers in the second reactor. The branching process is carried out by simultaneous addition of 0.082 M tribromoethylsilane in nefras in a molar ratio to Li of 0.25 and 0.085 M tin tetrachloride in a molar ratio to Li of 0.125; the reaction is carried out at 60° C. for 30 minutes. After that, the polymerized mixture from the first reactor is mixed with the polymerized mixture from the second reactor in a weight ratio of 0.5:0.5 for 20 minutes.

The obtained product contains 19.8% styrene and 61% of 1,2-butadiene units, glass transition temperature is −20° C., Mn=260000, polydispersity is 1.45, Mooney viscosity is 42.

Example 8

The process is carried out as described in Example 2, except that the process of branching is carried out by simultaneous addition of 0.082 M phenyltrichlorosilane in nefras in a molar ratio to Li of 0.1 and 0.089 M silicon tetrachloride in nefras in a molar ratio to Li of 0.2; the reaction is carried out at 65° C. for 60 minutes. After that, the polymerized mixture from the first reactor is mixed with the polymerized mixture from the second reactor in a weight ratio of 0.4:0.6 for 20 minutes.

The obtained product contains 19.7% styrene and 63% of 1,2-butadiene units, glass transition temperature is −23° C., Mn=328000, polydispersity is 1.5, Mooney viscosity is 47.

Example 9

The process is carried out as described in Example 2, except that a dose of n-butyllithium is 1.6 mmol based on 100 g of monomer in the first reactor, and of 1.0 mmol based on 100 g of monomers in the second reactor; the branching process is carried out by simultaneous addition of 0.083 M diphenyltin dichloride in nefras in a molar ratio to Li of 0.2 and 0.089 M germanium tetrachloride in nefras in a molar ratio to Li of 0.15; the reaction is carried out at 65° C. for 30 minutes. After that, the polymerized mixture from the first reactor is mixed with the polymerized mixture from the second reactor in a weight ratio of 0.6:0.4 for 7 minutes.

The obtained product contains 20% of styrene and 64% of 1,2-butadiene units, glass transition temperature is −24° C., Mn=299000, polydispersity is 1.6, Mooney viscosity is 45.

Example 10

The process is carried out as described in Example 2, except that a dose of n-butyllithium is 1.7 mmol based on 100 g of monomer in the first reactor, and of 1.1 mmol based on 100 g of monomers in the second reactor; the branching process is carried out by simultaneous addition of 0.08 M diphenyltin dichloride in nefras in a molar ratio to Li of 0.2 and 0.089 M tin tetrachloride in nefras in a molar ratio to Li of 0.15; the reaction is carried out at 70° C. for 60 minutes. After that, the polymerized mixture from the first reactor is mixed with the polymerized mixture from the second reactor in a weight ratio of 0.5:0.5 for 12 minutes.

The obtained product contains 21% of styrene and 65% of 1,2-butadiene units, glass transition temperature is −22° C., Mn=315000, polydispersity is 1.5, Mooney viscosity is 46.

Example 11

The process is carried out as described in Example 2, except that the dose of n-butyllithium is 1.6 mmol based on 100 g of monomer in the first reactor, and of 1.0 mmol based on 100 g of monomers in the second reactor; the process of branching is carried out by simultaneous addition of 0.08 M methyltrichlorosilane in nefras in a molar ratio to Li of 0.2 and 0.09 M germanium tetrachloride in nefras in a molar ratio to Li of 0.15; the reaction is carried out at 70° C. for 60 minutes. After that, the polymerized mixture from the first reactor is mixed with the polymerized mixture from the second reactor in a weight ratio of 0.4:0.6 for 20 minutes.

The obtained product contains 21% of styrene and 63% of 1,2-butadiene units, glass transition temperature is −23° C., Mn=330000, polydispersity=1.6, Mooney viscosity=48.

Example 12

The process is carried out as described in Example 2, except that, when conversion reaches 50.0%, a 0.09 M solution of divinylbenzene in nefras is fed to the first reactor in a molar ratio to Li of 0.1; the reaction is carried out for 45 minutes at 70° C., then a 0.08 M solution of tin tetrabromide is added in a molar ratio to Li of 0.2, and the reaction is carried out for additional 60 minutes at the same temperature. After that, the polymerized mixture from the first reactor is mixed with the polymerized mixture from the second reactor in a weight ratio of 0.8:0.2 for 10 minutes.

The obtained product contains 20.8% of styrene and 64% of 1,2-butadiene units, glass transition temperature is −25° C., Mn=300000, polydispersity=1.5, Mooney viscosity=42.

Example 13

The process is carried out as described in Example 2, except that phenyllithium is used as an iniyiator, and 0.66 M diethylamine in nefras in a ratio of diethylamine/phenyl-lithium of 1 mol is used as an electron donor additive. The first reactor is loaded with phenyllithium in the form of a 0.16 M solution in ether in an amount of 1.5 mmol based on 100 g of monomers. The second reactor is loaded with phenyllithium at the same concentration in an amount of 1.0 mmol based on 100 g of monomers.

The obtained copolymer contains 20% styrene and 60% of 1,2-butadiene units, glass transition temperature is −26° C., Mn=240000, polydispersity=1.5, Mooney viscosity—35.

Example 14

The process is carried out as described in Example 2, except that polybutadiene lithium is used as an initiator. A 0.082 M solution of dibromodiphenylsilane in nefras in a molar ratio to Li of 0.1 is fed to the first reaction as a branching agent; the reaction is carried out for 45 minutes at 60° C.; then a 0.089 M solution of germanium tetrachloride is added in a molar ratio to Li of 0.2, and the reaction is carried out for additional 45 minutes at the same temperature. When conversion reaches 99%, 1,3-diethyl-2-imidazolidinone is fed to the second reactor as a functionalizing agent; the reaction is continued for additional 45 minutes at the same temperature. After that, the polymerized mixture from the first reactor is mixed with the polymerized mixture from the second reactor in a weight ratio of 0.5:0.5 for 15 minutes.

The obtained product contains 20% styrene and 63% of 1,2-butadiene units, glass transition temperature is −25° C., Mn=380000, polydispersity=1.5, Mooney viscosity—55.

Example 15

The process is carried out as described in Example 13, except that two parallel metal reactors, wherein each reactor is of 1 liter and equipped with temperature and pressure testers, a loader, an unloader, a blander and a jacket are loaded with batch consisting of 700 g of nefras previously dried and deoxygenated, and 116 g of butadiene. When conversion reaches 99.5%, 0.082 M diphenyldifluorosilane in nefras is fed to the first reaction in a molar ratio to Li of 0.4; the reaction is carried out for 30 minutes at 60° C., then a 0.085 M solution of tin tetrachloride is added in a molar ratio to Li of 0.05; the reaction is carried out for additional 45 minutes at the same temperature. The reaction with a functionalizing agent (N,N-dimethylaminopropyl acrylamide) in the second reactor is carried out for 30 minutes. After that, the polymerized mixture from the first reactor is mixed with the polymerized mixture from the second reactor in a weight ratio of 0.8:0.2 for 20 minutes.

The obtained product contains 66% of 1,2-butadiene units, glass transition temperature is −38° C., Mn=380000, polydispersity=1.7, Mooney viscosity=55.

Example 16

The process is carried out as described in Example 13, except two parallel metal reactors, wherein each reactor is of 1 liter and equipped with temperature and pressure testers, a loader, an unloader, a blander and a jacket are loaded with batch consisting of 350 g of nefras previously dried and deoxygenated, 54 g of butadiene, and 4 g of isoprene. 0.066 M calcium butylate in toluene in a ratio of calcium butylate/phenyllithium of 1 mol is used as an electron donor additive. When conversion reaches 99.5%, a 0.082 M solution of diphenyldifluorosilane in nefras is fed to the first reactor in a molar ratio to Li of 0.5; the reaction is carried out for 30 minutes at 60° C., then a of 0.085 M solution of tin tetrachloride is added in a molar ratio to Li of 0.2, and the reaction is carried out for additional 45 minutes at the same temperature.

The obtained product has the isoprene/butadiene ratio of 7/93, and comprises 60% of 3,4-isoprene units and 66% of 1,2-butadiene units, glass transition temperature is −14° C., Mn=380000, polydispersity=1.7, Mooney viscosity=55.

Example 17

The process is carried out as described in Example 7, except that two parallel metal reactors, wherein each reactor is of a volume of 1 liter and equipped with temperature and pressure testers, a loader, an unloader, a blander and a jacket, are loaded with batch consisting of 350 g of nefras previously dried and deoxygenated, and 58 g of isoprene. Polyisoprenyllithium is used as an initiator. A dose of n-butyllithium is 2 mmol based on 100 g of monomer in the first reactor, and of 1.4 mmol based on 100 g monomers in the second reactor.

The obtained product contains 57% of 3.4%-isoprene units, glass transition temperature is −22° C., Mn=240000, polydispersity=2, Mooney viscosity=60.

Example 18

The process is carried out as described in Example 2, except that 0.66 M dimethylsulfide in toluene in the ratio of dimethylsulfide/n-butyllithium of 1 mol is used as an electron donor additive. When conversion reaches 95%, the second reactors is loaded with N-methyl-epsilon-caprolactam used as a functionalizing agent; the reaction is carried out at 60° C. for 30 minutes.

The obtained product contains 20% styrene and 60% of 1,2-butadiene units, glass transition temperature is −26° C., Mn=240000, polydispersity=1.5, Mooney viscosity=35.

Example 19

The process is carried out as described in Example 2, except that two parallel metal reactors, wherein each reactor is of a volume of 1 liter and equipped with temperature and pressure testers, a loader, an unloader, a blander and a jacket, are loaded with batch consisting of 350 g of nefras previously dried and deoxygenated, 17 g of styrene, 20 g of butadiene, and 20 g of isoprene. The mixture of electron donor additives includes 0.066 M tetramethylenediamine in nefras in a ratio of TMED/n-butyllithium of 0.15 mol and 0.07 M sodium tetrahydrofurfurylate in toluene in a ratio of TGFS/n-butyllithium of 0.1 mol. When conversion reaches 98%, the second reactors is loaded with N,N-diethylaminoethylstyrene used as a functionalizing agent, the reaction is carried out at 60° C. for 30 minutes.

The obtained product has the styrene/isoprene/butadiene ratio of 28/36/36, and contains 52% of 3,4-isoprene units and 45% of 1,2-butadiene units, glass transition temperature is −21° C., Mn=300000, polydispersity=1.8, Mooney viscosity=55.

Example 20

The process is carried out as described in Example 7, except that two parallel metal reactors, wherein each reactor is of a volume of 1 liter and equipped with temperature and pressure testers, a loader, an unloader, a blander and a jacket, are loaded with batch consisting of 350 g of nefras previously dried and deoxygenated, 10 g of alpha-methyl-styrene, 20 g of butadiene, and 25 g of isoprene. The mixture of electron donor additives includes 0.066 M tetramethylenediamine in nefras in a ratio of TMEDA/n-butyllithium of 0.5 mol and 0.1 M sodium tetrahydrofurfurylate in toluene in a ratio of STGF/n-butyllithium of 0.15 mol. When conversion reaches 98%, the second reactors is loaded with N-methylpyrrolidone used as a functionilized agent; the reaction is carried out at 60° C. for 30 minutes.

The obtained product has the alpha-methylstyrene/isoprene/butadiene ratio of 18/36/46, and contains 60% of 3,4-isoprene units and 49% of 1,2-butadiene units, glass transition temperature is −18° C., Mn=308000, polydispersity=1.86, Mooney viscosity=57.

Thus, the claimed method provides the production of branched functionalized diene (co)polymers characterized by a statistical distribution of monomer units, a narrow molecular weight distribution (MWD), and a high content of vinyl units (1,2-butadiene units and/or 3,4-isoprene units (more than 60%)) compared to the prototype. This is supported by Examples 2-17. The possibility of regulating the branched functionalized parts in a rubber is supported by all examples illustrated above. Examples 2, 4, 6, 8, 11, 13, 16, and 18-20 illustrate the regulation of the functionalized part of a rubber by increasing the flow rate of the second stream. Examples 3, 5, 9, 12, and 15 illustrate the regulation of the coupled branched part of a rubber by increasing the flow rate of the first stream.

The invention claimed is:

1. A method for producing branched functionalized diene (co)polymers by polymerization or copolymerization of dienes with each other and/or with arylvinyl compounds in a hydrocarbon solvent in the presence of an organolithium initiator, an electron donor additive, a functionalizing agent, and a branching agent, characterized in that the method is carried out in two reactors connected in parallel, wherein the polymerization or the copolymerization of the dienes with each other and/or with the arylvinyl compounds is carried out in each of the reactors, wherein the organolithium initiator, the electron donor additive, and the branching agent are fed to the first reactor without the functionalizing agent, and the organolithium initiator, the electron donor additive, and the functionalizing agent are fed to the second reactor without the branching agent, and resultant polymerizing mixtures are subsequently mixed with each other.

2. The method of claim 1 wherein the diene is selected from the group consisting of butadiene and isoprene.

3. The method of claim 1 wherein the organolithium initiator is selected from the group consisting of alkyllithium, aryllithium, and alkenyllithium.

4. The method of claim 1 wherein the organolithium initiator is fed to the first reactor in an amount of from 1.2 to 2.0 mmol based on 100 g of monomers.

5. The method of claim 1 wherein the organolithium initiator is fed to the second reactor in an amount of from 0.8 to 1.2 mmol based on 100 g of monomers.

6. The method of claim 1 wherein the electron donor additive is a compound comprising at least one heteroatom or a mixture thereof with alkali and/or alkaline metal alkoxides.

7. The method of claim 1 wherein the electron donor additive is a compound comprising products of a reaction between a compound comprising at least one heteroatom and an alkali and/or alkaline metal alkoxide.

8. The method of claim 7 wherein a molar ratio of the organolithium initiator to the alkali and/or alkaline metal alkoxide is 1:(0.1-1.0), and a molar ratio of the organolithium initiator to the compound comprising at least one heteroatom is 1:(0.1-1.0).

9. The method of claim 1 wherein the branching agent is added when a degree of conversion of the monomers reaches 50 to 100%.

10. The method of claim 1 wherein the branching agent is a compound selected from the group consisting of $Ehal_2R_2$, $Ehal_3R$, $E'Hal_4$, wherein E and E' are Sn, Ge, or Si; Hal is F, Cl, Br or I; R is $C_1$-$C_{20}$-alkyl or aryl, and benzene $C_6H_6$ having at least two hydrogen atoms substituted with a group selected from -Hal, —CH=CH$_2$ and —C(O)alkyl, wherein -Hal is as defined above, or several said compounds in any combination, wherein said compounds are added as the branching agent simultaneously or sequentially.

11. The method of claim 1 wherein the branching agent is used at a molar ratio to the organolithium initiator of from 0.01 to 0.99.

12. The method of claim 1 wherein the functionalizing agent is a compound selected from the group consisting of N,N-di-substituted aminoalkylacrylamides and N,N-di-substituted aminoalkylmetacrylamides, N,N-di-substituted aminoaromatic compounds, N-substituted cyclic amides, N-substituted cyclic ureas, and N-substituted cyclic aminoketones.

13. The method of claim 1 wherein the functionalizing agent is added when a degree of conversion of the monomers reaches 95 to 100%.

14. The method of claim 1 wherein the functionalizing agent is used at a molar ratio to the organolithium initiator of from 0.5 to 1.0.

15. The method of claim 1 wherein the polymerizing mixtures from the reactors are mixed with each other at a mass ratio of the first mixture to the second mixture, with the ratio ranging from (0.01-0.99) to (0.99-0.01).

* * * * *